US007593348B2

(12) United States Patent
Kodialam et al.

(10) Patent No.: US 7,593,348 B2
(45) Date of Patent: Sep. 22, 2009

(54) TRAFFIC-INDEPENDENT ALLOCATION OF WORKING AND RESTORATION CAPACITY IN NETWORKS

(75) Inventors: Muralidharan S. Kodialam, Marlboro, NJ (US); Tirunell V. Lakshman, Morganville, NJ (US); Sudipta Sengupta, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 933 days.

(21) Appl. No.: 10/776,466

(22) Filed: Feb. 11, 2004

(65) Prior Publication Data

US 2005/0174934 A1    Aug. 11, 2005

(51) Int. Cl.
*H04L 12/28* (2006.01)

(52) U.S. Cl. ..................................... 370/254; 370/468

(58) Field of Classification Search ................. 370/230, 370/235, 237, 255, 241, 256, 254, 468
See application file for complete search history.

(56) References Cited

U.S. PATENT DOCUMENTS 4,744,027 A * 5/1988 Bayer et al. .................... 705/7
5,854,903 A * 12/1998 Morrison et al. ............ 709/249
6,086,619 A * 7/2000 Hausman et al. ................ 703/6
6,404,744 B1 * 6/2002 Saito .......................... 370/255
2002/0071392 A1 * 6/2002 Grover et al. ............... 370/241
2002/0167898 A1 * 11/2002 Thang et al. ................. 370/216

OTHER PUBLICATIONS

Hauser et al. "Capacity Design of Fast Path Restorable Optical Networks", IEEE INFOCOM 2002, pp. 817-816.*
Xiong et al. "Restoration Strategies and Spare Capacity Requirement in Self-healing ATM Networks", IEEE/ACM Transaction on Networking, vol. 7, No. 1, Feb. 1999, pp. 98-110.*

* cited by examiner

*Primary Examiner*—Kwang B Yao
*Assistant Examiner*—Andrew Lai

(57) ABSTRACT

A given network of nodes that are interconnected by links having corresponding capacities has each link's capacity divided into working capacity and restoration capacity without a priori information about network traffic characteristics. Allocation of working capacity and restoration capacity for the network might be optimized by characterization of the network in accordance with a linear programming problem (LPP) subject to network constraints and then generating a solution to the LPP either exactly or with an approximation. Partitioning the capacity of each link in the network into working and restoration capacities minimizes the restoration capacity overhead in the network to allow for higher network utilization.

16 Claims, 2 Drawing Sheets

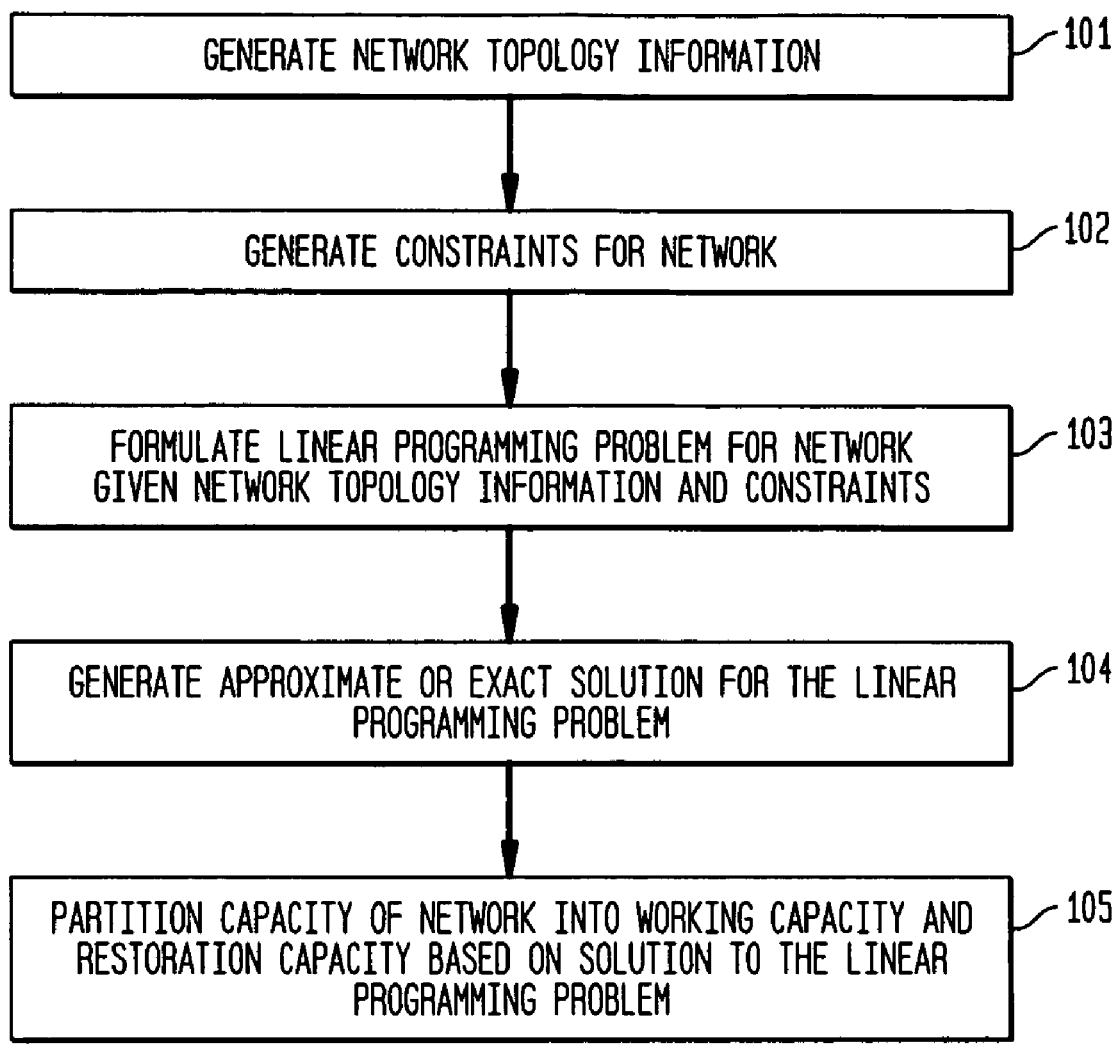

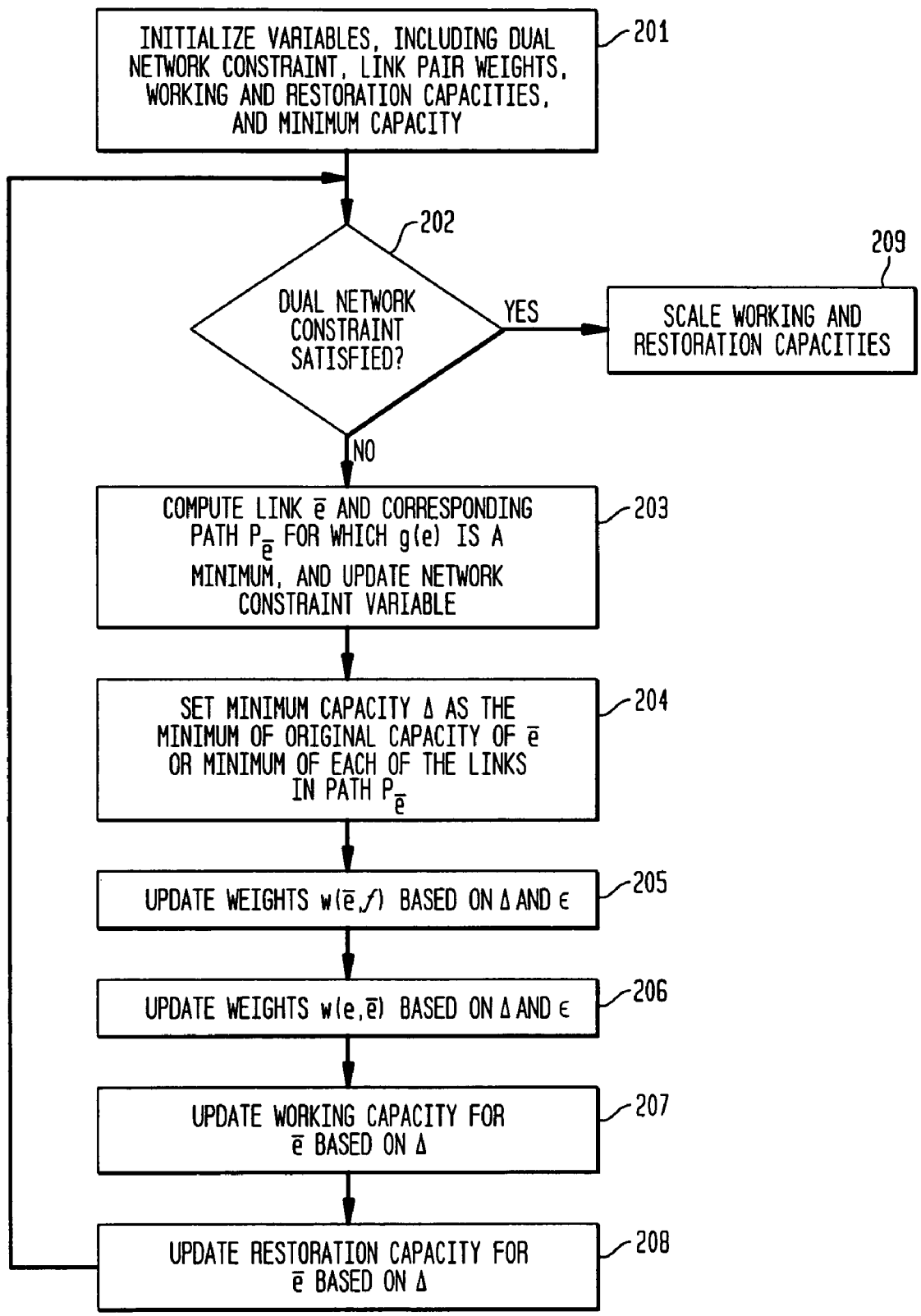

TRAFFIC-INDEPENDENT ALLOCATION OF WORKING AND RESTORATION CAPACITY IN NETWORKS

BACKGROUND OF THE INVENTION

1. Field of the Invention

The present invention relates to capacity allocation in a telecommunications network, and, more particularly, to allocation of working and restoration capacity of links of the network.

2. Description of the Related Art

In an interconnected communication network, users establish connections between a source node and a destination node with a stream of data that is transferred through the network over a network path. The data of one or more connections constitutes traffic over the network. Optical networks are typically characterized by a set of optical switches (i.e., nodes) connected via optical links. Packet networks (which may be implemented using optical networks) are typically characterized by routers (also considered nodes) interconnected by electrical or optical links. A network path for a connection between a given source-destination (node) pair is defined by a set of nodes (the source and destination node pair and any intermediate nodes) interconnected by a set of links coupled to the nodes carrying the data stream, or flow, of the connection. Each node and each link has a capacity corresponding to the traffic it may carry, and "capacity" may be a general term describing bandwidth, effective bandwidth, link quality, or similar link transmission characteristic.

Dynamic provisioning of bandwidth-guaranteed paths with fast restoration capability is an important network service feature for many networks, such as Multi-Protocol Label Switched (MPLS) networks and optical mesh networks. In optical networks, fast restoration is a major requirement since optical transport networks carry a variety of traffic types each with different, stringent reliability requirements. Similar fast restoration capabilities may be used in MPLS networks in order to provide the needed reliability for services such as packetized voice, critical virtual private network (VPN) traffic, or other quality of service (QoS) guarantees.

A connection in a network might be protected at the path level or at the link level. For link restoration (also often referred to as local restoration or as fast restoration), each link of the connection is protected by a set of pre-provisioned detour paths that exclude the link being protected. Upon failure of the link, traffic on the failed link is switched to the detour paths. Thus, link restoration provides a local mechanism to route around a link failure. In path restoration, the primary, or working, path of the connection is protected by a "diverse" backup path from source to destination. Upon failure of any of the resources on the working path, traffic is switched to the backup path by the source node. Link restoration might typically restore service much faster than path restoration because restoration is locally activated and, unlike path restoration, failure information need not propagate back through the network to the source.

Each link of a network has a corresponding capacity to transfer data, which link capacity is typically expressed as a link characteristic such as bandwidth or effective bandwidth (a quantity that takes into account transmission requirements such as buffer and/or transmission delay, packet loss, and QoS guarantees). This link capacity may be divided into working capacity and reservation capacity through network provisioning. Working capacity is the capacity of the link reserved for connections (traffic) under normal operating conditions, while reservation capacity is the capacity of the link employed for rerouting connections when a link, path, or node failure occurs within the network. For reservation capacity, several different restoration paths may commonly share the reservation capacity of a link (termed "shared reservation capacity usage").

Two important performance metrics that are employed to evaluate different restoration routing methods are i) low restoration latency (the time it takes to switch to restoration links/paths) and ii) low restoration overhead (the amount of restoration capacity reserved in the network as a percentage of total capacity usage). Since restoration capacity is not used under normal no-failure conditions (except possibly by low priority traffic that may be preempted), the objective of minimizing restoration capacity overhead in the network translates to higher network utilization.

A given network is said to be edge bi-connected if the removal of any single link does not disconnect the network. Hence, for any link e between nodes i and j (i.e., e=(i, j)), a path $B_e$ exists from node i to node j that does not include link e. For a first exemplary network, 50% of the capacity of every link might be reserved for working traffic, where all link capacities are equal. Then, when a link e fails, its working traffic, which is at most 50% of the link's capacity, may be rerouted on detour $B_e$, because (i) every link on $B_e$ has 50% of its capacity reserved for restoration traffic, and (ii) all link capacities are equal. Hence, for this exemplary network, 50% of the network capacity is reserved for restoration.

For a second exemplary network, edge connectivity of the network is 3 (i.e., at least 3 links must be removed to disconnect the network, where, again, all link capacities are equal. In this case, for any link e=(i,j), two link disjoint paths $B_e$ and $B'_e$ exist from node i to node j that do not include link e. Suppose that ⅔ (≈67%) of the capacity of every link is reserved for working traffic. Then, when a link e fails, half of its working traffic, which is at most ⅓ of the link capacity, may be rerouted on detour $B_e$, and the other half on detour $B'_e$, since (i) every link on $B_e$ and $B'_e$ has ⅓ of its capacity reserved for restoration traffic, (ii) detours $B_e$ and $B'_e$ are link disjoint, and (iii) all link capacities are equal. Hence, for the second exemplary network, 33% of the network capacity is reserved for restoration.

As these two exemplary networks illustrate, edge connectivity of the network, the link capacities, and the required link working capacities affect the allocation of capacity reserved for restoration.

SUMMARY OF THE INVENTION

In accordance with exemplary embodiments of the present invention, a given network of nodes that are interconnected by links having corresponding capacities has each link's capacity divided into working capacity and restoration capacity without a priori information about network traffic characteristics. Each link in the network is partitioned into working capacity and restoration capacity so as to satisfy these network constraints: 1) guarantee that, for each link, a set of detour paths exists whose bandwidths sum to the working capacity of the link; 2) guarantee that, for each link, the sum of the working capacity and the shared reservation capacity usage of the detour paths going through it is at most the total capacity of the link, and 3) maximize the working capacity of the network (i.e., sum of the working capacities of all links). Allocation of working capacity and restoration capacity for the network might be optimized by characterization of the network in accordance with a linear programming problem (LPP) subject to the network constraints that maximize working capacity of the network, and then generation of a solution to the LPP either exactly or with an approximation. Partitioning the capacity of each link in the network into working and restoration capacities minimizes the restoration capacity overhead in the network to allow for higher network utilization.

In accordance exemplary embodiments of the present invention, capacity of a network is partitioned into working capacity and restoration capacity by: (a) generating a set of network constraints for a network of nodes interconnected by links in accordance with a network topology; (b) formulating a linear programming problem (LPP) for the network topology based on the set of network constraints, and (c) generating either an exact or an approximate solution for the LPP, the solution including a working capacity and a restoration capacity of each link of the network.

BRIEF DESCRIPTION OF THE DRAWINGS

Other aspects, features, and advantages of the present invention will become more fully apparent from the following detailed description, the appended claims, and the accompanying drawings in which:

FIG. 1 shows an exemplary method of partitioning network capacity in accordance with the present invention; and FIG. 2 shows an exemplary approximation method of partitioning network capacity in accordance with the present invention.

DETAILED DESCRIPTION

FIG. 1 shows an exemplary fixed-capacity reservation method 100 of partitioning network capacity in accordance with an exemplary embodiment of the present invention. As employed herein, the term "fixed-capacity" implies that the capacities of the links of the network after partitioning are fixed a priori. At step 101, network topology information is generated for the network. The network topology information includes the nodes and the links between the nodes of the network. The network topology information also includes the capacity of the links between the nodes. Thus, the network may be modeled as a graph of nodes and links, where each link has an associated capacity, and each link may also have a corresponding link cost. Assigning such cost is well-known in the art, and may be related to, for example, a guaranteed bandwidth or other quality of service (QoS) metric, importance of the link in the connectivity of the network, or actual monetary cost of the link.

At step 102, constraints for the network are generated. In accordance with exemplary embodiments of the present invention, the fixed-capacity reservation method partitions the network into working capacity and restoration capacity. This partitioning of the network into working (also termed service) and restoration capacity is accomplished on a link-by-link basis. The total capacity (e.g., bandwidth or effective bandwidth) of each link in the network is partitioned into working capacity and restoration capacity so as to satisfy these network constraints: 1) guarantee that, for each link, a set of detour paths exists whose bandwidths sum to the working capacity of the link; 2) guarantee that, for each link, the sum of the working capacity and the shared capacity usage of the detour paths going through it is at most the total capacity of the link, and 3) maximize the working capacity of the network (i.e., sum of the working capacities of all links).

At step 103, the three network constraints are formulated as a linear programming problem (LPP). The LPP is a network design problem with the objective of maximizing the working capacity of the network under constraints 1) and 2) above.

Thus, each link in the network is partitioned into working capacity and reservation capacity so as to maximize the working capacity of the network (i.e., the sum of the reserved working capacity on each link). This network design problem does not assume any point-to-point traffic matrix, and hence, is traffic-independent. Constraints 1) and 2) above ensure that, when partitioning link bandwidth usage for the scheme, a portion of the bandwidth of each link has been reserved for working traffic and a set of detours computed whose bandwidths sum to the working capacity of the link.

At step 104, either an exact solution or an approximation for the solution to the LPP is generated. Since the method for generating a solution to the LPP may depend on the formulation of the LPP, different formulations of the LPP are described subsequently.

At step 105, each link in the network is partitioned into the corresponding working capacity and restoration capacity values for the link as specified by the solution to the LPP generated in step 104. Such partitioning may typically be accomplished through network provisioning.

For link restoration when a link e (also termed an "edge") in a path P fails, each link of the connection in path P is protected by a detour path that excludes link e. Upon failure of link e, traffic on link e is switched to the detour path. At any given time, the variable $r_e$ represents the residual working capacity of link e, and the variable $b_e^i$ represents the residual capacity of the $i^{th}$ detour for that link, and so $$\sum_i b_e^i = r_e,$$

$\forall e \in E$ (since the sum of the restoration bandwidths over the detour path must be equal to the working capacity being backed-up). A demand (i.e., a request to route a connection) with bandwidth b may be routed on this link if $b \leq r_e$ and $b \leq \max_i b_e^i$. If $b_e^{max} = \max_i b_e^i$, then $b_e^{max} \leq r_e$.

Routing of demands for a network employing, for example, the exemplary fixed capacity reservation method of FIG. 1 under link failure conditions may be enabled as follows. To route demands in a distributed fashion at the ingress node for a network partitioned in accordance with one or more exemplary embodiments of the present invention, the value of $b_e^{max}$ is distributed for every link e in the network using traffic engineering extensions to the link state routing protocol. A demand of bandwidth b may then be routed at the ingress node by (i) computing the path using a simple shortest path algorithm working on a sub-graph of the network with links having $b_e^{max} \leq b$, and (ii) signaling the path using a signaling protocol, such as RSVP-TE (resource reservation protocol—traffic engineering) or CR-LDP (constraint-based routing—label distribution protocol). The assignment of a detour to every link of the connection might be done locally at the intermediate nodes during signaling. Also, algorithms known in the art for routing bandwidth-guaranteed unprotected paths in an online fashion might be used for path computation to maximize network throughput.

Assignment of detours to connections for any given link e might be re-optimized locally (and periodically) so as to maximize the value of $b_e^{max}$ for that link, since link detours may be assigned to connections locally during signaling and do not carry traffic under normal no-failure conditions. Such re-optimization may increase the residual capacity of the given link e and overall network throughput. For MPLS-based networks, two methods of allocating labels are employed for link detours. In the first method, a single detour exists for all label switched paths (LSPs) traversing the link, and label stacking is employed to nest all affected LSPs into the detour LSP when the link fails. In the second method, which may be preferred for use with embodiments of the present invention, different LSPs traversing a link may have different detours. In this case, the label mapping for the detour LSPs is done on a per connection basis for every (primary or working) LSP traversing the link.

Returning to FIG. 1, the following definitions and terminology are defined and described as an aid to understanding the present invention with respect to steps 101, 102, and 103. A given network is represented with a set N of nodes and a set E of links (also termed "edges"). A node i and a node j are directly connected by a link, (i,j). As known in the art, if a network has one or more nodes having multiple links, the graph of the network may be modified to replace the multiple-link nodes with several inter-connected nodes coupled to the links.

The total capacity of link (i, j) is denoted by $u_{ij}$, and, to simplify notation, a generic link in the network may also be represented by a letter such as "e" or "f" instead of (i,j). A portion $x_{ij}$, $0 \leq x_{ij} \leq u_{ij}$, of the capacity of link (i,j) is reserved for working traffic. The remaining portion $(u_{ij}-x_{ij})$ of the link's capacity $u_{ij}$ is reserved for restoration traffic. The fraction $\alpha_{ij}$ of link (i, j) reserved for restoration traffic is defined as $\alpha_{ij}=(1-(x_{ij}/u_{ij}))$. The restoration capacity overhead fraction for the entire network is given in equation (1):

$$\frac{\sum_{(i,j)\in E}(u_{ij}-x_{ij})}{\sum_{(i,j)\in E}u_{ij}} \tag{1}$$

Two exemplary LPP formulations as may be employed by step 103 of FIG. 1 for the link-partitioning problem. The first LPP formulation is termed a "link-indexed" LPP formulation and may be employed if partitioning of the link into working and restoration capacities is link based (i.e., when the restoration process switches traffic based on a failure in a given link within the network. The second LPP formulation is termed a "path-indexed" LPP formulation and may be employed if path based (i.e., when the restoration process switches traffic based on a failure in a given link in a network path between a given node pair).

The link-indexed LPP formulation is expressed as a linear program with network flow constraints. A working bandwidth $x_{ij}$ ($0 \leq x_{ij} \leq u_{ij}$) is reserved on link (i, j); then, when link (k, l) fails, traffic for working bandwidth $x_{ij}$ is rerouted along a set of detours for this link (i, j). This traffic for working bandwidth $x_{ij}$ is modeled as a network flow of value $x_{ij}$ from node k to node l, using links other than (k, l). Variable $y_{ij}^{kl}$ denotes this network flow $x_{ij}$ from node k to node l, using links other than (k, l). The link-indexed LPP formulation is as given in relation (2) subject to the constraints of equations (3) and (4):

$$\text{maximize} \sum_{(k,l)\in E} x_{kl} \tag{2}$$

$$\sum_{j:(i,j)\in E} y_{ij}^{kl} - \sum_{j:(j,i)\in E} y_{ji}^{kl} = \begin{cases} x_{kl} & \text{if } i=k \\ -x_{kl} & \text{if } i=l \\ 0 & \text{otherwise} \end{cases}$$

$$\forall i \in N, (k,l) \in E; y_{kl}^{kl}=0 \ \forall (k,l) \in E \tag{3}$$

$$x_{kl}+y_{kl}^{ij} \leq u_{kl} \forall (i,j), (k,l) \in E, (i,j) \neq (k,l) \tag{4}$$

The relation (2) states that the network flow (working bandwidth) is maximized for all possible link failures (k,l). The constraint of equation (3) ensures that a network flow $x_{ij}$ from node k to node l is positive when rerouted using links other than (k, l) for all link pairs (i,j) and (k,l). The constraint of equation (4) ensures that the sum of the working traffic and the restoration traffic that appears on a link due to failure of any other link is at most the capacity of the link. This link-indexed LPP formulation has polynomial number of variables and constraints and, hence, may be solved in polynomial time using standard LPP solving programs such as cplex. Using the standard method for decomposing flows into paths, such as CPLEX, the set of detours for link (k, l) may be derived from the variables $y_{ij}^{kl}$ for each (i,j).

The path-indexed LPP formulation is also expressed as a linear program with network flow constraints. However, the -indexed LPP formulation might not be solved by techniques known in the art, due to the complexity of the formulation for large networks of nodes and links. As before, $x_{ij}(0 \leq x_{ij} \leq u_{ij})$ is defined as the working capacity on link (i, j). If link (i, j) fails, then $x_{ij}$ working capacity is rerouted through detour paths that originate from node i, end at node j, and are disjoint with link (i, j).

The set $P_{ij}$ denotes the set of all paths from node i to node j that do not contain link (i, j), and f(P) denotes the restoration traffic on a path P in the set $P_{ij}$ after failure of the link (i, j) that path P protects. Among the paths in the set $P_{ij}$, those that form the detour paths for link (i, j) have their f(P) values sum to $x_{ij}$, as expressed in equation (5):

$$\sum_{P:P\in P_{ij}} f(P) = x_{ij}, \tag{5}$$

and the objective of maximizing $$\sum_{(i,j):(i,j)\in E} x_{ij}$$

is equivalent to the expression of relation (6):

$$\text{maximize} \sum_{(i,j):(i,j)\in E} \sum_{P:P\in P_{ij}} f(P) \tag{6}$$

The total traffic on link e=(i, j) is estimated in order to arrive at the capacity constraints of equations (5) and (6) for each link. The working traffic on link e is given by equation (5), and restoration capacity may appear on link e only due to the failure of some other link f≠e. In that case, link e must belong to some path P∈$P_f$ with f(P)>0. Thus, the total restoration traffic on link e due to failure of link f is given by equation (7):

$$\text{Total Restoration Traffic} = \sum_{P: P \in P_f, e \in P} f(P) \qquad (7)$$

The sum total of working capacity and restoration capacity (or total traffic) on each link e must be at most the total capacity $u_e$ of link e. Consequently, the path-indexed LPP formulation for optimal link partitioning into working and restoration traffic is as given by relation (6) (reproduced below) with constraint as given in equation (8):

$$\text{maximize} \sum_{e: e \in E} \sum_{P: P \in P_e} f(P), \text{ subject to} \qquad (6)$$

$$\sum_{P: P \in P_e} f(P) + \sum_{P: P \in P_f, e \in P} f(P) \le u_e \quad \forall f \ne e, \; e, f \in E \qquad (8)$$

For a special case of given problem formulation, all links may have equal partition size (percentage wise), which partition size is a fraction $\alpha$. Given that the fraction $\alpha$ of every link is reserved for working capacity, the maximum working capacity on link e=(i,j) is $\alpha u_e$. The variable F(e) denotes the maximum network flow that may be routed from node i to node j using links other than e and under given link capacities. Since the restoration bandwidth reserved on any link is $(1-\alpha)$ times its original capacity, and because of the linearity of maximum network flow, the maximum restoration capacity over all possible detours for link e is $(1-\alpha)F(e)$, which must be at least equal to the working capacity on link e, as expressed in equation (9):

$$(1-\alpha)F(e) \ge \alpha u_e \; \forall e \in E \qquad (9)$$

Solving the above inequality of equation (9) yields the expression for $\alpha$ in equation (10):

$$\alpha \le \frac{F(e)}{u_e + F(e)} \quad \forall e \in E. \qquad (10)$$

Thus, the maximum possible value of $\alpha$ is given by equation (11):

$$\alpha = \min_{e \in E} \frac{F(e)}{u_e + F(e)} \qquad (11)$$

This value of $\alpha$ given in equation (11) may be computed using m maximum flow ("maxflow") value computations, one for each link e (m is the number of links), to determine F(e), thus providing a simple polynomial time exact algorithm for the special case of equal link partition sizes. Techniques for computing the maxflow value for a given network graph with provisioned capacity are well-known in the art. For example, a discussion of maximum flow calculation is given in Ahuja, Magnanti, and Orlin, *Network Flows: Theory, Algorithms, and Applications*, Prentice-Hall, 1993, Chapter 7, which is incorporated herein in its entirety by reference.

Further, when all link capacities are equal, the value of $F(e)/u_e$ for link e=(i, j) is the maximum number of link disjoint paths from i to j not containing e. Thus, the value of $\alpha$ when all link capacities are equal is determined by the link whose endpoints may be disconnected by removing the minimum number of links from the network. This minimum number is equal to the edge connectivity of the given network.

An algorithm might be employed to generate an approximate solution to the path-indexed LPP formulation of equations (6) and (8). One type of approximation algorithm computes link partitions up to a $(1+\epsilon)$-factor of the optimal objective function value (maximum network working capacity) for any $\epsilon > 0$. The value of E may be selected so as to provide a predetermined (desired degree of) optimality for the solution. The $(1+\epsilon)$-approximation algorithm maintains solutions to both the primal and dual linear programming problems at each step.

The dual formulation of the LLP of equations (6) and (8) associates a dual variable w(e, f) with each link pair $e \ne f$, $e \in E$, $f \in E$. The dual variable w(e, f) corresponds to the constraint of equation (8) that the working capacity on link e plus the restoration capacity that appears on link e due to failure of link $f (f \ne e)$ is at most the capacity $u_e$ of link e. The dual of the path-indexed linear programming problem (dual PI LPP) may be expressed as in equation (12) subject to the constraint of equation (13):

$$\text{minimize} \sum_{e: e \in E} \sum_{f: f \in E; f \ne e} u_e w(e, f) \text{ subject to:} \qquad (12)$$

$$\sum_{f: f \in E, f \ne e} w(e, f) + \sum_{e': e' \in P; e' \ne e} w(e', e) \ge 1 \quad \forall P \in P_e, e \in E \qquad (13)$$

The weights w(e, f) of the dual PI LPP might be considered as signs that correspond to combinations of a link e and each other link $f \ne e$ that can fail and possibly cause restoration traffic to appear on link e. Each link e' is a link in the shortest (restoration) path P between the nodes connected by e when the link e is removed from the network. Shortest path computation may employ, for example, the well-known Dijkstra's algorithm, such as described in E. Dijkstra, "A Note: Two Problems In Connection With Graphs," Numerical Mathematics, vol. 1, 1959, pp. 269-271, which is incorporated herein by reference. For a given link e, g(e) denotes the minimum value of the left hand side (LHS) of the dual program constraint in equation (13) over all paths $P \in P_e$.

Given the weights w(e, f), g(e) might be computed in polynomial time as follows: Let (i,j) denote the link from node i to node j (i.e., e=(i, j)). If the link e is removed from the graph of the network and the shortest path from node i to node j is computed under link weights w(e', e) for $e' \in E$, then g(e) is the cost of this shortest path (equal to the sum of the weights w(e', e)) plus the sum of weights w(e, f) over all $f \ne e$.

Given a set of weights w(e, f), a feasible solution for the dual program is satisfied if and only if the relation of equation (14) holds true:

$$\min_{e: e \in E} g(e) \ge 1 \qquad (14)$$

FIG. 2 shows an exemplary method of link partition in accordance with the present invention employing a $(1+\epsilon)$ approximation, also termed a fully polynomial time approximation scheme (FPTAS). At step 201, various variables are initialized, including minimum capacities, dual network constraint, link pair weights w(e,f), working capacities (work(e)) for each link, and restoration capacities (bkp(e)) for each link.

Initially, weights w(e,f) are all equal and set to δ (i.e., w(e,f)=δ) (the quantity δ depends on the selected value of ε, as given subsequently).

At step 202, a test determines whether the dual network constraints ("G") are satisfied. If the test of step 202 determines that the dual network constraints are satisfied, the method advances to step 209, described subsequently. If the test of step 202 determines that the dual network constraints are not satisfied, the method advances to step 203.

At step 203, a link $\bar{e}$ is computed for which g(e) is minimum, thus identifying for the link $\bar{e}$ a corresponding path P∈P$_{\bar{e}}$. In step 203, the link $\bar{e}$ is computed using, for example, a shortest path computation under given link weights, and then "G" is updated with this minimum g(e) using, for example, the relation of the LHS of equation (13). At step 204, the minimum capacity value Δ is computed as the minimum of i) the capacity of link $\bar{e}$ and ii) the smallest link capacity of each of the links on the path P determined in step 203. At step 205, the weights w($\bar{e}$,f) are updated as w($\bar{e}$,f)←w($\bar{e}$,f)(1+εΔ/u$_{\bar{e}}$) (where "←" indicates that "the variable gets the new value of"). At step 206, the weights w(e,$\bar{e}$) are updated as w(e,$\bar{e}$)←w(e,$\bar{e}$)(1+εΔ/u$_e$). At step 207, the working capacity work($\bar{e}$) for link $\bar{e}$ is incremented by Δ. At step 208, for each link e of the path P corresponding to $\bar{e}$, the restoration capacity bkp(e,$\bar{e}$) on link e due to failure of link $\bar{e}$ is incremented by Δ. From step 208, the method returns to step 202.

The value for ε is an arbitrarily small number (much less than 1) selected by a designer for a given implementation of the method. The smaller the value of ε, the more iterations may be required for the method to generate the approximate solution.

If the test of step 202 determines that the dual network constraints are satisfied, then the method advances to step 209. At step 202, if the dual network constraints are satisfied, the primal capacity constraints on each link are not necessarily satisfied, since the approximation method increments working capacities with original (and not residual) link capacity at each stage. Consequently, at step 209, the working and restoration capacities on each link are scaled uniformly so that both primal and dual capacity constraints are met.

For optical mesh networks, cross-connections are set up on the link detour(s) after failure for restoration, which may employ end-to-end signaling on the link detour. In order to bound restoration latency in optical networks when employing the method of FIG. 2, a hop constraint (e.g., at most h hops) may be imposed on each link detour. Imposing hop constraints may be incorporated into the method of FIG. 2 by restricting P$_e$ to contain paths of at most h hops and using, for example, a Bellman-Ford algorithm to compute shortest paths bounded by a hop count of h.

The values of ε and δ are related: for any given ε'>0 (i.e., a given design arbitrarily selects a small value for ε'), the approximation link-partition algorithm computes a solution with objective function value within (1+ε') factor of the optimum for ε and δ as given in equations (15) and (16):

$$\delta = \frac{(1+\varepsilon)}{((1+\varepsilon)(n+m-2))^{1/\varepsilon}} \text{ and} \quad (15)$$

$$\varepsilon = 1 - \frac{1}{\sqrt{1-\varepsilon'}}, \quad (16)$$

where m is the number of links and n is the number of nodes in the network. A discussion of ε-capproximation algorithms may be found in Garg and Konemann, "Faster and Simpler Algorithms for Multicommodity Flow and Other Fractional Packing Problems," which is incorporated herein in its entirety by reference.

The following pseudo-code may be employed to implement the exemplary method shown in FIG. 2. Arrays work(e) and bkp(e, f), respectively, track the working traffic on link e and the restoration traffic that appears on link e due to failure of link f. The variable G (dual network constraint variable) is initialized to 0 and remains <1 as long as the dual constraints remain unsatisfied. After the while loop terminates, the factor by which the capacity constraint on each link e gets violated is computed into array scale(e). Finally, the array work(e) is divided by the maximum capacity violation factor and the resulting values are output as the working capacity partition on each link.

```
100     w(e, f) ← δ      ∀ e ≠ f, e ∈ E, f ∈ E 101     work(e) ← 0      ∀ e ∈ E 102     bkp(e, f) ← 0    ∀ e ≠ f, e ∈ E, f ∈ E

103     G ← 0;

104     while G < 1 do:
105         for each e=(i,j) ∈ E do:
106             Compute shortest path S(e) from node i to node j under
                link costs
107             c, where c(e')=w(e',e) ∀ e'≠e and c(e)=∞;

108             g(e) ← ∑_{f:f∈E,f≠e} w(e, f) + cost(S(e));

109         end for

110         G ← min_{e∈E} g(e);

111         if G > 1 break;
112         Let ē be the link for which g(e) is minimum;

113         Δ ← min(u_ē, min_{e∈S(ē)} u_e);

114         work(ē) ← work(ē) + Δ;

115         for each e ∈ S(ē) do:

116             bkp(e, ē) ← bkp(e, ē) + Δ;

117         end for
118         for each f ≠ ē, f ∈ E do:

119             w(ē, f) ← w(ē, f)(1 + εΔ/u_ē);

120         end for
121         for each e ∈ S(ē) do:

122             w(e, ē) ← w(e, ē)(1 + εΔ/u_e);

123         end for
124     end while
125
126     for 127         bkp_max(e) ← max_{f:f≠e,f∈E} bkp(e, f);
```

-continued

| 128 | scale(e) ← (work(e) + bkp_max(e))u_e; |
| --- | --- |
| 129 | end for |
| 130 | scale_max ← max_{e∈E} scale(e); |
| 131 | for each e ∈ E do: |
| 132 | work(e) ← work(e) / scale_max; |
| 133 | end for |
| 134 | Output work(e) as the working capacity on link e; |

While the exemplary embodiments of the present invention are described with respect to various equations, the present invention is not limited to the form of these equations. One skilled in the art may modify these equations by scaling, or may form different approximate solutions to the linear programming problems described herein employing any of a number of techniques well known in the art.

The present invention may be embodied in a processor, such as a network controller or computer, and the processor may be coupled to a network or network database to receive network topology, provisioning, and capacity information used by the methods as described herein. In addition, the present invention may be employed for either optical or non-optical networks, and may be employed for either synchronous or asynchronous networks.

Routing design of primary and restoration paths in accordance with one or more embodiments of the present invention may provide for the following advantages. First, the routing design is traffic independent and does not depend on forecasted traffic patterns. Second, the routing design enables "restoration-oblivious routing" in that network partitioning into primary and restoration paths makes online routing of restorable traffic in the network extremely simple since any demand may be routed in an unprotected fashion on the working capacity network using simple routing methods such as shortest cost path or widest shortest path.

Third, the partitioning of the network i) provides sharing of bandwidth across detour paths protecting different links without maintaining elaborate state information in a database, ii) allows for simple implementation/operation, and iii) does not place any additional routing load on the constrained routing resources at the network nodes. Fourth, the partitioning of the network enables estimation of the restoration capacity overhead of the network without any knowledge of future traffic patterns. Fifth, the routing design allows for relatively fast computation of link partitioning sizes so as to maximize the working capacity of the network up to any given closeness to optimality.

As would be apparent to one skilled in the art, the various functions of capacity design for restorable connections may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A network controller-implemented method of partitioning capacity of a network into working capacity and restoration capacity, the method comprising the steps of:
   (a) the network controller generating a set of network constraints for a network of nodes interconnected by links in accordance with a network topology, wherein the network constraints include:
      1) for each link, a set of one or more detour paths exist whose capacities sum to the working capacity of the link;
      2) for each link, the sum of the working capacity and the restoration capacity, as a whole, shared by the set of one or more detour paths is, at most, a total capacity of the link; and
      3) the working capacity of the network is maximized;
   (b) the network controller formulating a linear programming problem (LPP) for the network topology based on the set of network constraints; and
   (c) the network controller generating either an exact or an approximate solution for the LPP, the solution including a working capacity and a restoration capacity of each link of the network.

2. The invention of claim 1, further comprising the step of (d) partitioning the capacity of each link of the network based on the solution for the LPP.

3. The invention of claim 1, wherein, for step (b), the LPP formulation is generated for the network having an equal partition size for the working capacity and restoration capacity of each link e of a set E of links in the network, and step (c) generates the solution based on a fraction α for the equal partition size, the fraction α given by:

$$\alpha = \min_{e \in E} \frac{F(e)}{u_e + F(e)}$$

where "min(•)" denotes the mathematical "minimum of •", $u_e$ is the capacity of link e, and F(e) is the maximum flow value between nodes coupled by e when e is removed from the network.

4. The invention of claim 1, wherein, for step (b), the LPP is a path-indexed LPP formulation.

5. The invention of claim 4, wherein step (c) further comprises the step of (c1) generating a dual of the path-indexed LPP formulation.

6. The invention of claim 5, wherein step (c) further comprises the step of (c2) approximating the solution with a (1+ϵ) approximation algorithm.

7. The invention of claim 4, wherein, for step (c), the path-indexed LPP formulation is given by:

$$\max \sum_{e:e \in E} \sum_{P:P \in P_e} f(P), \text{ subject to}$$

$$\sum_{P:P \in P_e} f(P) + \sum_{P:P \in P_f, e \in P} f(P) \leq u_e \quad \forall f \neq e, \ e, f \in E,$$

where "max(•)" denotes the mathematical "maximize •", E denotes a set of links in the network, e and f are links in the network, $u_e$ denotes the capacity of link e, $P_e$ denotes the set of all paths P that do not contain link e, and f(P) denotes the restoration traffic on a given path P after failure of the link that it protects.

8. The invention of claim 1, wherein, for step (b), the LPP is a link-indexed LPP formulation.

9. The invention of claim 8, wherein, for step (b), the link-indexed LPP formulation is given by:

$$\max \sum_{(k,l) \in E} x_{kl}$$

$$\sum_{j:(i,j) \in E} y_{ij}^{kl} - \sum_{j:(j,i) \in E} y_{ji}^{kl} = \begin{cases} x_{kl} & \text{if } i = k \\ -x_{kl} & \text{if } i = l \\ 0 & \text{otherwise} \end{cases}$$

$$\forall i \in N, \ (k, l) \in E; \ y_{kl}^{kl} = 0 \ \forall (k, l) \in E$$

$$x_{kl} + y_{kl}^{ij} \leq u_{kl} \ \forall (i, j), (k, l) \in E, \ (i, j) \neq (k, l),$$

where i, j, k, and l are indices corresponding to node numbers, "max(•)" denotes the mathematical "maximize •", N denotes a set of nodes in the network, E denotes a set of links in the network, $u_{ij}$ denotes the capacity of link (i,j), $x_{ij}$ ($0 \leq x_{ij} \leq u_{ij}$) denotes a working capacity reserved on link (i,j), $y_{ij}^{kl}$ denotes a network flow equal to $x_{ij}$ from node k to node l using links other than (k, l).

10. The invention of claim 1, wherein, for step (a), the network is either an electro-optical network or a packet-based network.

11. A network controller-implemented method of partitioning capacity of links in a network into working capacity and restoration capacity, the method comprising the steps of:
(a) the network controller determining a link $\bar{e}$ and a corresponding shortest path P that minimize a combination of i) a sum of a set of shortest-path link weights of the corresponding path P when $\bar{e}$ fails and ii) a sum of the link weights when each other link not in the corresponding path P fails;
(b) the network controller computing a minimum capacity of i) the capacity of link $\bar{e}$ and ii) the smallest link capacity of each of the links on the corresponding path P;
(c) the network controller updating each of the link weights based on the minimum capacity in accordance with a (1+ϵ) approximation method;
(d) the network controller incrementing, by the minimum capacity, the working capacity on link $\bar{e}$ and the restoration capacity of each link in the given path P; and
(e) the network controller repeating steps (a) through (e) until a set of dual network constraints are satisfied.

12. The invention of claim 11, further comprising the step of scaling, if the set of dual network constraints are satisfied, the working capacity and the restoration capacity of each link so as to satisfy a set of primal capacity constraints.

13. The invention of claim 11, wherein the method is implemented by a processor of a centralized network management system.

14. A network controller-implemented method of partitioning capacity of a network into working capacity and restoration capacity, the method comprising the steps of:
(a) the network controller generating a set of network constraints for a network of nodes interconnected by links in accordance with a network topology;
(b) the network controller formulating a linear programming problem (LPP) for the network topology based on the set of network constraints; and
(c) the network controller generating either an exact or an approximate solution for the LPP, the solution including a working capacity and a restoration capacity of each link of the network;
wherein, for step (b), the LPP formulation is generated for the network having an equal partition size for the working capacity and restoration capacity of each link e of a set E of links in the network, and step (c) generates the solution based on a fraction α for the equal partition size, the fraction α given by:

$$\alpha = \min_{e \in E} \frac{F(e)}{u_e + F(e)},$$

where "min(•)" denotes the mathematical "minimum of •", $u_e$ is the capacity of link e, and F(e) is the maximum flow value between nodes coupled by e when e is removed from the network.

15. A network controller-implemented method of partitioning capacity of a network into working capacity and restoration capacity, the method comprising the steps of:
(a) the network controller generating a set of network constraints for a network of nodes interconnected by links in accordance with a network topology;
(b) the network controller formulating a path-indexed linear programming problem (LPP) for the network topology based on the set of network constraints; and
(c) the network controller generating either an exact or an approximate solution for the LPP, the solution including a working capacity and a restoration capacity of each link of the network, wherein the path-indexed LPP formulation is given by:

$$\max \sum_{e:e \in E} \sum_{P:P \in P_e} f(P),$$

$$\text{subject to} \sum_{P:P \in P_e} f(P) + \sum_{P:P \in P_f, e \in P} f(P) \leq u_e \ \forall f \neq e, e, f \in E,$$

where "max(•)" denotes the mathematical "maximize •", E denotes a set of links in the network, e and f are links in the network, $u_e$ denotes the capacity of link e, $P_e$ denotes the set of all paths P that do not contain link e, and f(P) denotes the restoration traffic on a given path P after failure of the link that it protects.

16. A network controller-implement method of partitioning capacity of a network into working capacity and restoration capacity, the method comprising the steps of:

(a) the network controller generating a set of network constraints for a network of nodes interconnected by links in accordance with a network topology;
(b) the network controller formulating a link-indexed linear programming problem (LPP) for the network topology based on the set of network constraints; and
(c) the network controller generating either an exact or an approximate solution for the LPP, the solution including a working capacity and a restoration capacity of each link of the network, wherein the link-indexed LPP formulation is given by:

$$\max \sum_{(k,l) \in E} x_{kl} \sum_{j:(i,j) \in E} y_{ij}^{kl} - \sum_{j:(j,i) \in E} y_{ji}^{kl} = \begin{cases} x_{kl} & \text{if } i = k \\ -x_{kl} & \text{if } i = l \\ 0 & \text{otherwise} \end{cases}$$

-continued $$\forall i \in N, (k, l) \in E; y_{kl}^{kl} = 0 \forall (k, l) \in E$$

$$x_{kl} + y_{kl}^{ij} \leq u_{kl} \forall (i, j), (k, l) \in E, (i, j) \neq (k, l),$$

where i, j, k, and l are indices corresponding to node numbers, "max(•)" denotes the mathematical "maximize •", N denotes a set of nodes in the network, E denotes a set of links in the network, $u_{ij}$ denotes the capacity of link (i,j), $x_{ij}$ ($0 \leq x_{ij} \leq u_{ij}$) denotes a working capacity reserved on link (i, j), $y_{ij}^{kl}$ denotes a network flow equal to $x_{ij}$ from node k to node l using links other than (k, l).

* * * * *

UNITED STATES PATENT AND TRADEMARK OFFICE
CERTIFICATE OF CORRECTION

| | | |
|---|---|---|
| PATENT NO. | : 7,593,348 B2 | Page 1 of 1 |
| APPLICATION NO. | : 10/776466 | |
| DATED | : September 22, 2009 | |
| INVENTOR(S) | : Kodialam et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1382 days.

Signed and Sealed this

Fourteenth Day of December, 2010

David J. Kappos
*Director of the United States Patent and Trademark Office*